United States Patent [19]

Park

[11] 4,419,411

[45] Dec. 6, 1983

[54] MULTI-LAYER POLYPROPYLENE FILM STRUCTURE AND METHOD OF FORMING SAME

[75] Inventor: Hee Chung P. Park, Fairport, N.Y.

[73] Assignee: Mobil Oil Corporation, New York, N.Y.

[21] Appl. No.: 452,483

[22] Filed: Dec. 23, 1982

[51] Int. Cl.$^3$ ............................................. B32B 27/08
[52] U.S. Cl. ..................................... 428/516; 428/349; 428/910; 525/240; 156/244.11
[58] Field of Search ............... 428/516, 349, 347, 910; 525/240; 156/244.11, 244.24

[56] References Cited

U.S. PATENT DOCUMENTS

| | | | |
|---|---|---|---|
| 3,399,156 | 8/1968 | Bell | 524/583 |
| 3,519,531 | 7/1970 | James et al. | 428/349 |
| 4,117,193 | 9/1978 | Tsuchiya et al. | 428/516 |
| 4,252,851 | 2/1981 | Lansbury et al. | 428/347 |
| 4,259,412 | 3/1981 | Buzio et al. | 428/910 |
| 4,348,457 | 9/1982 | Rosenthal et al. | 428/349 |

*Primary Examiner*—George F. Lesmes
*Assistant Examiner*—E. Rollins Buffalow
*Attorney, Agent, or Firm*—A. J. McKillop; M. G. Gilman; J. F. Powers, Jr.

[57] ABSTRACT

A multi-layer polypropylene structure of low COF over a wide temperature range and a method for forming the same.

13 Claims, No Drawings

MULTI-LAYER POLYPROPYLENE FILM STRUCTURE AND METHOD OF FORMING SAME

BACKGROUND OF THE INVENTION

The invention relates to a multi-layer polypropylene structure having exceptionally low film to film coefficient of friction over a wide temperature range.

Highly crystalline polypropylene film is an excellent packaging material, but it has a high film coefficient of friction which makes it difficult to utilize in automatic packaging equipment. This material, in film form, also has a tendency to block at the surfaces under pressure. The blocking tendency is manifest during packaging operations where rolls of film are employed, making it difficult to remove the film from the rolls.

Certain innovations have improved on the surface friction characteristics of highly crystalline polypropylene in film form. For example, in U.S. Pat. No. 3,176,021, it is taught to include minor quantities of fatty acid amides into the polypropylene. In order, however, to obtain the benefits taught by this patent, certain limitations must be observed. The film must be formed from a melt extruded at a temperature between about 400°–550° F. In addition, the amide must be present in from 0.005 to about 2.0 of the polypropylene, and it must be present along with from 0.1 to about 4.0 weight percent of polyethylene. Under these conditions and limitations, the resulting polypropylene film will have a static coefficient of friction no higher than 0.6 which is significantly higher than present day requirements. In addition, such a film does not have the high stereoregularity required by present day packaging demands. Further, it has been found that once said film has been subjected to temperature conditions approaching 140° F., the coefficient of friction increases significantly and is nowhere near the present day requirements of 0.25.

In U.S. Pat. No. 3,399,156, it is taught that the inclusion of the combination of silicone oil and finely divided silica into a polypropylene film produces a film which will have a coefficient of friction from 0.45 to 0.6 and the suitable for use in bread-wrapping machines. This is not a low enough coefficient of friction for use in present day, high speed automatic packaging machinery.

It has been found that to a certain extent high crystallinity in polypropylene impedes facile migration of additives to the surface of such as polymer in film form. This problem has been addressed in copending application Ser. No. 400,830, filed July 22, 1982. This application teaches that by the coextrusion of a comparatively thin skin layer of polypropylene of comparatively low stereoregularity with a core layer of polypropylene of comparatively high stereoregularity, where this core layer contains a surface modifying agent, such as, an amide of fatty acid, the amide will bloom to the surface of the comparatively low stereoregularity polymer with comparative ease.

It is an object of the present invention to provide a multi-layer polypropylene film structure having an extremely low coefficient of friction over a wide temperature range.

It is another object to provide a process for preparing this multi-layer structure.

SUMMARY OF THE INVENTION

It has been discovered that by a unique combination of surface modifying agents, a multi-layer structure of unusual characteristic is obtained.

The present invention is directed to an oriented multi-layer polypropylene film structure comprising coextended layers of:

(a) a base layer comprising polypropylene of comparatively high stereoregularity, the precursor resin of which contains an amide of a water-insoluble monocarboxylic acid having about 8 to about 24 carbon atoms, and mixtures of said amides;

(b) a skin layer comprising a polyolefin of comparatively low stereoregularity on at least one surface of (a), said skin layer containing a surface-modifying proportion of a combination of finely divided silica and a silicone oil;

the surface of (b) having bloomed thereon a surface-modifying proportion of at least some of the amide of (a).

It has been determined that the structure defined will have a coefficient of friction which is at least as low as 0.25. Moreover, it has been determined that this coefficient of friction is maintainable as such at least up to about 140° F. It is preferred that the skin layer of the subject multilayer films be of an ethylene propylene copolymer wherein the ethylene content is from about 2 to about 7 weight percent.

The present invention also is directed to a process for preparing the above-identified oriented multi-layer polypropylene structure comprising melt coextruding a combination of:

(a) a base layer comprising polypropylene of comparatively high stereoregularity, the precursor resin of which contains an amide of a water-insoluble monocarboxylic acid having about 8 to about 24 carbon atoms, and mixtures of said amides; and (b) a skin layer comprising a polyolefin of comparatively low stereoregularity on at least one surface of (a), said skin layer containing a surface-modifying proportion of a combination of finely divided silica and a silicone oil; and orienting the structure, whereby said amide of (a) exudes or blooms to the surface of (b) to a greater extent than in the absence of (b). In a preferred embodiment of the process the structure is biaxially oriented and (b) is an ethylene propylene copollymer of 2–7% by weight ethylene.

DETAILED DESCRIPTION OF THE INVENTION

The present invention is broadly directed to the improvement of the surface characteristics of a multi-layer structure, the core layer of which is highly crystalline or highly stereoregular polypropylene in oriented film form. The preferred polypropylenes of the core layer are well known in the art and are formed by polymerizing polypropylene in the presence of stereospecific catalyst systems. They can have a melt index at 230° C. ranging from about 1–25.0. The crystalline melting point is about 160° C. The number average molecular weight ranges from about 25,000–100,000. The density ranges from about 0.90 to 0.91.

The comparatively low stereoregular polyolefin polymers contemplated by the present invention include, for example, random copolymers of ethylene and propylene; ethylene-propylene-butylene terpolymers; and blends of polypropylene and polybutylene. Particularly preferred are the ethylene-propylene copolymers which contain from about 2 to about 7 weight percent ethylene. They can have a melt index at 230° C. ranging from about 2 to 15 and preferably 3 to 8. The crystalline melting point is about 125° C. to 150° C. The number average molecular weight range is from about 25,000 to 100,000. The density ranges from about 0.89 to 0.90. These copolymers have excellent heat seal characteristics. They do not, however, have the excellent physical characteristics inherent in the polypropylene of comparatively high stereoregularity. Thus, the core material of polypropylene of high stereoregularity possesses the excellent characteristics of good moisture barrier, stiffness, high strength, good optical properties, and the thin coextruded surface layer of the comparatively low stereoregular ethylene propylene random copolymer provides excellent heat seal characteristics. In addition, the coextrusion of these two materials permits the slip agents of the present invention to bloom from the core material through the ethylene propylene copolymer skin layer and to the surface thereof so as to be available to lower the coefficient of friction of the film surface and be maintained as such up to 140° F.

The overall thickness of the contemplated multi-layered structure is primarily of the highly stereoregular polypropylene. The highly isotatic polypropylene portion of this structure should amount to from about 70 to about 97% of the overall film structure. The coextruded layer of comparatively low stereoregularity may be present on one of both surfaces of the core layer. It is preferred that if the skin layer is on both sides of the core layer that the thickness of each skin can range from about 1.5% to about 15% of the core layer. If a single skin layer is on the surface of the base film, the preferred range is from about 3 to 15% of the overall thickness. The overall thickness of the multi-layer film structure is not critical but preferably can range from about 0.35 to about 2.0 mils.

The present invention is based upon the discovery that a combination of three surface modifying agents are unexpectedly superior to a significant extent than the individual agents or any combination less than all of the agents. This is particularly true when the multi-layer film structure is to be subjected to temperatures approaching 140° C.

As indicated above, one class of surface modifying agents employed herein is an amide of a water-insoluble monocarboxylic acid having about 8 to about 24 carbon atoms, and mixtures of said amides. Specific examples of this class of amides are erucamide, oleamide, stearamide, behenamide, etc. It is preferred that this additive be included in the highly stereoregular core polypropylene in an amount of from about 300 to 500 parts per million.

In the practice of the present invention, it is to be understood that the comparatively low stereoregular copolymer coextruded with the comparatively high stereoregular polypropylene may or may not also contain the amide slip agent dispersed in its resin precursor. Sufficient amide will be exuded from the base or core film through the copolymer film to its surface and, thus, amide additive in the outer film resin starting material is not necessary but may be desired. In addition, the outer film could not be the sole supply of the amide additive since its thickness would be insufficient to supply an adequate quantity thereof and still cope with base film or core equilibration loss. If the amide were solely in the skin layer, during coextrusion and subsequent heat exposure, equilibrium tendencies would force most of the amide into the core layer and insufficient amide would be available to contribute to low COF. Further, optical characteristics would suffer if the skin layer were the sole source of the slip agent. Thus, the base film must be the principal source of the amide surface modifying additive.

As indicated, the ethylene propylene random copolymer skin layer contains a combination of finely divided silica and a silicone oil. The silica can be any commercially available finely divided silica, preferably that having a mean particle size ranging from about 0.5 to 5 microns. One commercially available silica has a mean particle size of 0.75 microns and another has a mean particle size of 4.5 microns. Either material can be employed. The silica can be present in from about 0.05 to 0.5 weight percent of the skin layer. The silicone oil is preferably a dimethylsiloxane having a viscosity of about 350 to about 800,000 centistokes. This siloxane can be present in from about 0.15 to 0.4 weight percent of said skin layer. The percentage of the additives in the multi-layer structure should be such as to yield a coefficient of friction of the surface of the skin layers of 0.25 or less. More particularly, the proportions should be such that the coefficient of friction of the surface of the skin layer or layers is 0.25 or less and maintainable as such at least up to about 140° F.

The multi-layer films of the present invention can be prepared employing commercially available systems for coextruding resins. The polypropylene homopolymer of comparatively high stereoregularity containing the desired amount of amide slip agent can be coextruded with an ethylene propylene random copolymer of comparatively low stereoregularity containing the appropriate percentage of a combination of silica and dimethylsiloxane dispersed therein. The polymers are brought to the molten state and coextruded from a conventional extruder through a flat sheet die, the melt streams being combined in an adapter prior to being extruded from the die. Each skin layer can comprise, for example, approximately 6.0% of the total thickness of the film. After leaving the die orifice, the multi-layer film structure is chilled and the quenched sheet then reheated and stretched, e.g., five times in the machine direction (MD) and then subsequently, for example, 8 times in the transverse direction (TD). The edges of the film can be trimmed and the film wound onto a core. It is preferred that the thus formed structure be conditioned or equilibrated by holding the same for a period of about 6 hours to one week at a temperature of from about 80°-125° F., especially preferred is a time from about 6 hours to about 72 hours at between 100°-125° F. This film will have on the surface thereof a combination of the three additives, amide, silica, and silicone oil, which will provide a coefficient of friction of 0.25 or lower.

With the application of a single layer of ethylene propylene random copolymer on one surface of the high stereoregular polypropylene layer, the uncoated surface will have only amide bloomed thereon and be of a lower quantity than that on the opposite surface in combination with the silica and the silicone oil. This might be particularly advantageous in certain instances where an asymmetry of COF is desired on opposite surfaces.

Several methods exist for the characterization of resins in terms of their relative stereoregular character. One method, found to be especially useful, consists of determining the temperature at which the Complex Modulus reaches an arbitrarily selected reference level when the film is heated. The apparatus used for this test is a Rheovibron Model DDV-II, manufactured by the Toyo Measuring Instruments Company of Japan. The conventional oven supplied by the manufacturer of this instrument was replaced by an oven heated with a forced air stream and is therefore capable of rapidly reestablishing temperature after the oven has been opened to introduce the test sample.

The details of the test procedure are:

(1) a 27 mil plaque of the resin to be tested is prepared by compression molding at 400° F., followed by quenching in a 50° C. water bath. Individual rectangular test strips are cut from this plaque measuring 4.6 cm×0.4 cm×27 mils.

(2) the oven is preheated to the approximate desired temperature and the sample is rapidly inserted and mounted in the sample grips of the Rheovibron device. The oven is closed and, after exactly 90 seconds, the complex modulus is determined at 60 cycles per second. At the same time the air temperature immediately adjacent the test sample is determined by a thermocouple.

(3) Complex Modulus data so collected are determined at three temperatures covering approximately a 10° F. range. Three replicates are tested at each temperature. The temperature range is selected to include that temperature at which the value of the Complex Modulus would be $1.40 \times 10^8$ dynes per square centimeter.

(4) the data are plotted and the temperature at which the value of the Complex Modulus is $1.4 \times 10^8$ dynes is determined. This temperature is termed $T_R$. The higher the value of $T_R$, the more stereoregular or crystalline in character is the resin within a given family of resins (polypropylene). The following Table tabulates commercially available material, some of which are employed in the following specific examples, and under the heading $T_R$ gives the temperature or temperature range value which is indicative of the degree of stereoregularity of the material.

TABLE

| Polymeric Materials | $T_R$ |
| --- | --- |
| Tenite 612 (Eastman Chemical Products) | 298–300° F. |
| Hercules 6531 | 306.9° F. |
| Shell LF 6405 | 311.5° F. |
| ARCO 8670E | 309–311° F. |
| ARCO W472 | 309–311° F. |
| ARCO 9670 | 265° F. |
| ARCO W756 (ethylene propylene random copolymer 3.6% ethylene) | 265° F. |
| CHISSO XF7500 | 265° F. |

Coefficients of friction or slip may be determined by the "moving slide-stationary film" method as defined in U.S. Pat. No. 3,399,156, the disclosure of which is incorporated herein in its entirety.

EXAMPLE 1

A polypropylene homopolymer of comparatively high stereoregularity i.e. ARCO 8670 E, containing about 2500 parts per million of erucamide dispersed therein is melt coextruded with skin layers of ARCO 9670, an ethylene-propylene copolymer containing 3% by weight ethylene. The molten polymers are coextruded, as described above from a conventional extruder through a flat sheet die, the melt streams being combined in an adaptor prior to being extruded. After leaving the die orifice, the film is quenched and reheated to an orientation temperature of about 290° F. and oriented 5 times MD and 8 times TD. The total gauge of the multi-layer structure is 0.8 mil and the skin layers each are about 6% of this thickness. This structure will have a coefficient of friction (COF) of about 0.1. On subjecting the film to a temperature of abut 140° F. and above, however, the COF will deteriorate to greater than 0.25.

EXAMPLE 2

A polypropylene homopolymer of the same high stereoregularity and molecular weight as that of Example 1 but without a slip agent therein, i.e. ARCO W472, is melt coextruded with skin layers of ARCO 9670, ethylene-propylene copolymer, containing 0.3% by weight dimethylsiloxane having a viscosity of 30,000 centistokes. The structure is oriented as in Example 1 and the dimensions are approximately the same. This structure will have a coefficient of friction of greater than 0.8.

EXAMPLE 3

This multi-layer structure is formed of the same polymers and exactly as in Example 2 except 0.3% by weight of $SiO_2$ of a mean particle size of 0.75 microns is present in the ethylene-propylene layers instead of the siloxane. This structure will have a coefficient of friction of greater than 0.6.

EXAMPLE 4

ARCO 8670 E, homopolypropylene containing 2500 parts per million of erucamide is melt blended with ARCO W472 homopolypropylene containing no erucamide to yield a polypropylene blend containing 500 parts per million erucamide. This is melt coextruded with skin layers of ARCO 9670 ethylene-propylene copolymer containing 0.3% by weight of the silica of Example 3 and 0.3% by weight of the silioxane of Example 2. The structure is oriented as in Example 1 and the dimensions will be approximately the same. This structure will have a coefficient of friction of less than 0.25 and it will be maintainable as such up to 140° F.

This will show that there is an unexpected, synergistic effect on the combined use of the fatty acid amide, silicone oil and silica in the multi-layer structures of the present invention.

What is claimed:

1. An oriented multi-layer polypropylene film structure having surface-modifying agents comprising finely divided silica, silicone oil and an amide of a water-insoluble monocarboxylic acid having from about 8 to about 24 carbon atoms on a surface thereof, said structure comprising coextruded layers of:
   (a) a base layer comprising polypropylene of comparatively high stereoregularity, the precursor resin of which contains an amide of a water-insoluble monocarboxylic acid having from about 8 to about 24 carbon atoms, and mixtures of said amides; and
   (b) a skin layer comprising a polyolefin of comparatively low stereoregularity on at least one surface of (a), said skin layer containing a combination of finely divided silica and a silicone oil; the surface of (b) having bloomed thereon at least some of the amide of (a).

2. The structure of claim 1 wherein the coefficient of friction of the surface of (b) is at least as low as 0.25.

3. The structure of claim 2 wherein the coefficient of friction of the surface of (b) is at least as low as 0.25 and maintainable as such at least up to about 140° F.

4. The structure of claim 2 wherein (b) is a member selected from the group consisting of an ethylene-propylene random copolymer, ethylene-propylene-butylene terpolymer and a blend of polypropylene and polybutylene.

5. The structure of claim 4 wherein (b) is an ethylene-propylene random copolymer with an ethylene content of from about 2 to 7 weight %.

6. The structure of claim 4 wherein said amide is present in said precursor resin is from 300 to 500 parts per million.

7. The structure of claim 4 wherein said silicone oil is dimethyl siloxane having a viscosity of about 350–800,000 centistokes.

8. The structure of claim 7 wherein said siloxane is present in from about 0.15 to 0.4 weight % of said skin layer.

9. The structure of claim 4 wherein said silica has a mean particle size of from about 0.5 to 5 microns.

10. The structure of claim 9 wherein said silica is present in from about 0.05 to 0.5 weight % of said skin layer.

11. The structure of claim 4 wherein said amide is present in said precursor resin is from about 300 to 500 parts per million, said silicone is a dimethyl siloxane having a viscosity of from about 350 to 800,000 centistokes and in an amount of from about 0.15 to 0.4 weight % and said silica is of mean particle size range of from about 0.5 to 5 microns and in an amount of from about 0.05 to 0.5 weight %.

12. The structure of claim 11 wherein (b) is an ethylene-propylene random copolymer.

13. The process for preparing an oriented multi-layer polypropylene structure comprising melt coextruding a combination of:
(a) a base layer comprising polypropylene of comparatively high stereoregularity, the precursor resin of which contains an amide of a water-insoluble monocarboxylic acid having about 8 to about 24 carbon atoms, and mixtures of said amides; and
(b) a skin layer comprising a polyolefin of comparatively low stereoregularity on at least one surface of (a), said skin layer containing a surface-modifying proportion of a combination of finely divided silica and a silicone oil; and orienting the structure, whereby at least some of said amide of (a) exudes or blooms to the surface of (b) to a greater extent than in the absence of (b).

* * * * *